United States Patent [19]

Smith et al.

[11] 3,774,205
[45] Nov. 20, 1973

[54] MERCHANDISE MARK SENSING SYSTEM
[75] Inventors: Richard C. Smith; William M. Bechtold, both of Dayton, Ohio
[73] Assignee: The National Cash Register Company, Dayton, Ohio
[22] Filed: Aug. 2, 1971
[21] Appl. No.: 167,958

[52] U.S. Cl. .......................................... 343/6.5 SS
[51] Int. Cl. ............................................... G01s 9/56
[58] Field of Search ................................ 343/6.5 SS

[56] References Cited
UNITED STATES PATENTS

| | | | |
|---|---|---|---|
| 3,706,094 | 12/1972 | Cole et al. | 343/6.5 SS |
| 3,713,102 | 1/1973 | Martin | 343/6.5 SS X |
| 3,169,242 | 2/1965 | Davis et al. | 343/6.5 SS |
| 3,247,509 | 4/1966 | Hamann et al. | 343/6.5 SS |
| 3,521,280 | 7/1970 | Janco et al. | 343/6.5 SS |
| 3,384,892 | 5/1968 | Postman | 343/6.5 SS |

*Primary Examiner*—T. H. Tubbesing
*Attorney*—Louis A. Kline et al.

[57] ABSTRACT

A system for the automatic reading of prices, stock keeping units and other like information, attached or affixed to packages and the like, and also providing pilferage control means. Responders, i.e., an array of microminiature resonant devices capable of storing and imparting information, are utilized in association with packages and the like for the storage of encoded information because of their ability to respond to certain microwave signals having a particular resonant frequency at a first plane of polarization and the further ability to reradiate signals to a receiver having a second plane of polarization, the or of the transmitted and received signal being the same. The polarization of the transmitted signals covering the frequency range of the responders provides a system in which a continuously transmitted signal may be utilized. Means are provided for initially polarizing and directing the microwave signals towards the responders and means of different polarization are provided for detecting the reradiated signals.

7 Claims, 9 Drawing Figures

3,774,205

INVENTORS
RICHARD C. SMITH &
WILLIAM M. BECHTOLD

BY

THEIR ATTORNEYS

INVENTORS
RICHARD C. SMITH &
WILLIAM M. BECHTOLD

Louis A. Kline
BY Albert L. Sassler Jr.

THEIR ATTORNEYS

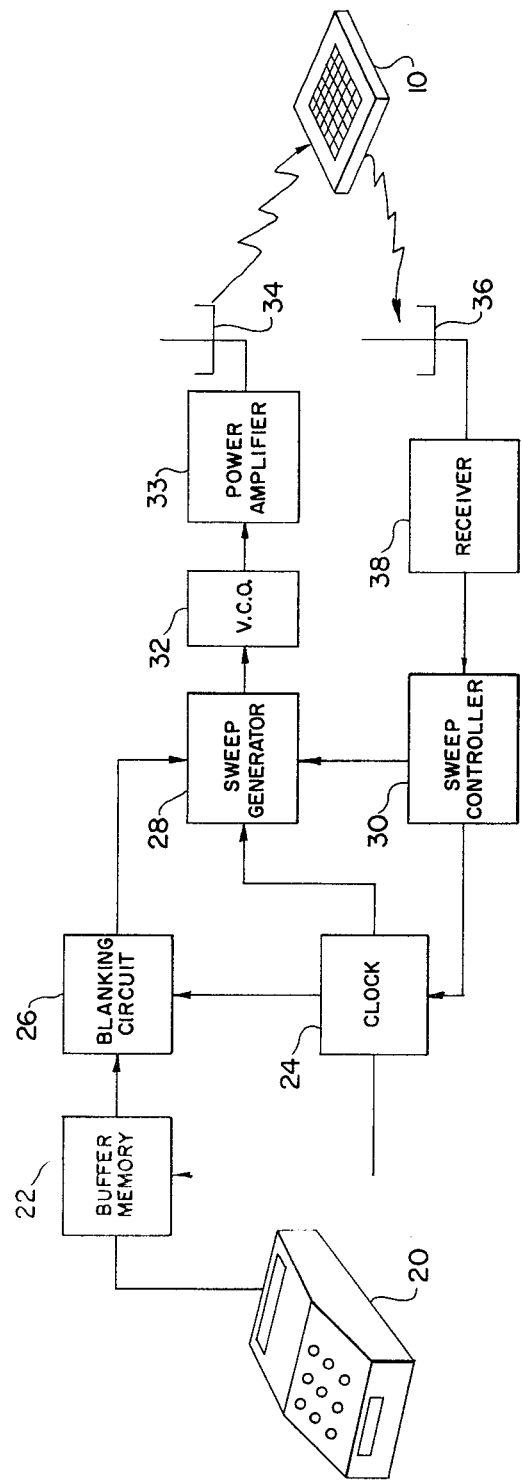

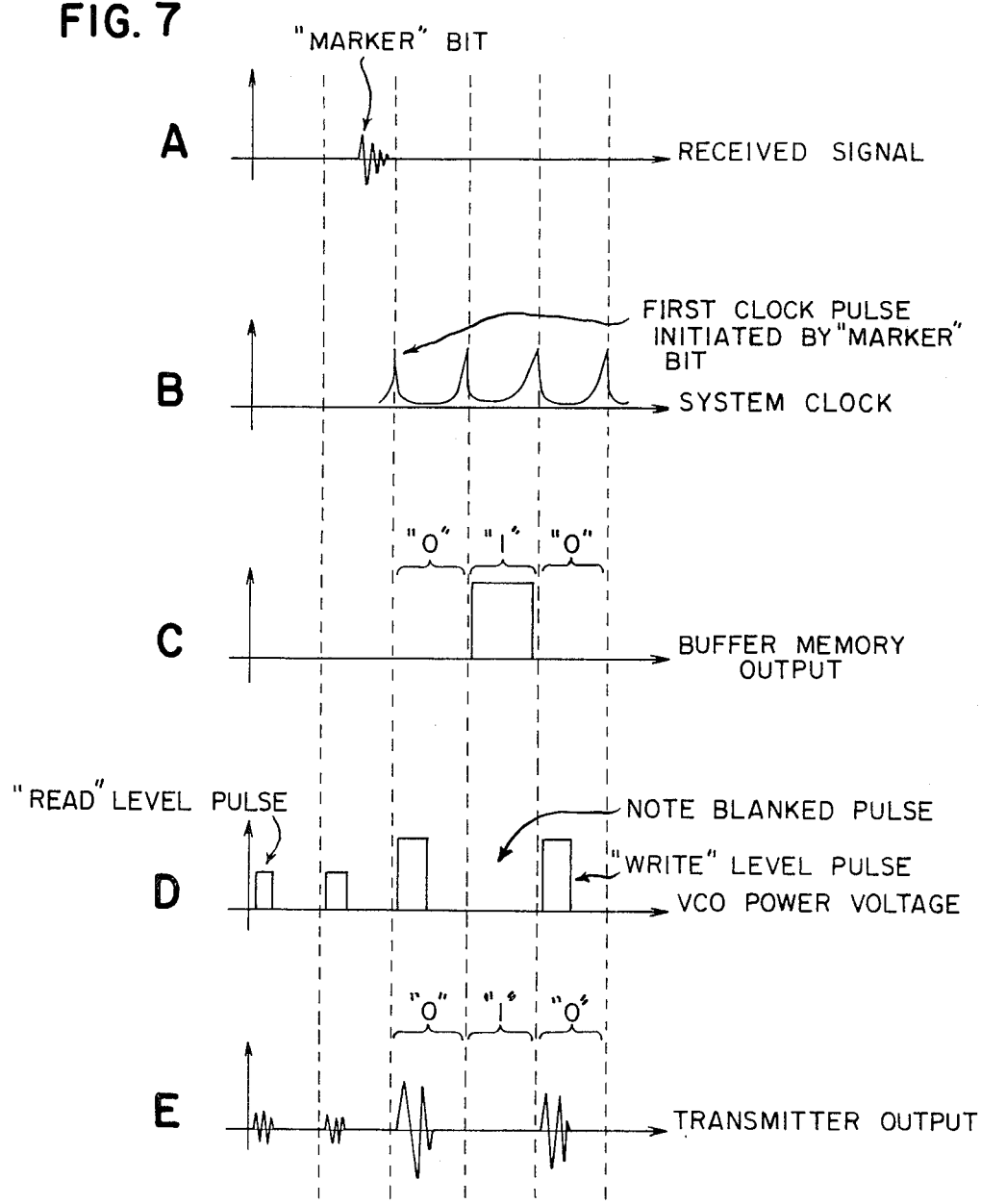

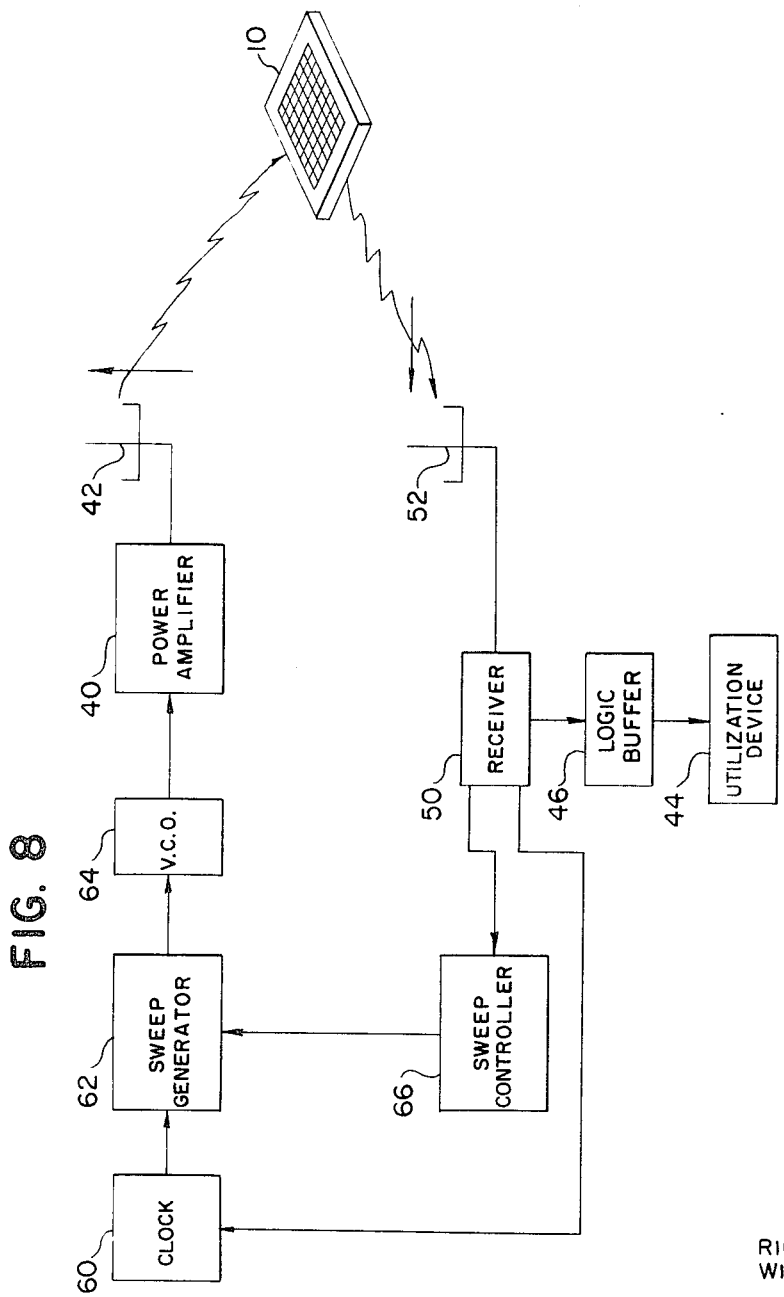

MERCHANDISE MARK SENSING SYSTEM

BACKGROUND OF THE INVENTION

1. Field of the Invention

This invention relates to a merchandise mark sensing system for the automatic reading of prices and stock keeping units.

2. Description of the Prior Art

The past several years have witnessed substantial activity in the design of systems in which the attaching of a coded device onto an article facilitates the automatic reading of information with regard to, or detection of, that article as it passes a particular check-out point. More particularly, the coded device, attached to some article, in many cases contains price and inventory control data. The coded device, as it passes by a specific point, e.g., a check-out counter, in response to an interrogating signal, transmits radio waves, light, or some type of intelligence carrying medium, to a detector which controls a cash register or similar device in response to that intelligence and may transmit data to a computer for additional purposes, depending upon the system requirements.

One such system is described in U.S. Pat. No. 3,521,280 issued to Janco et al. The Janco patent discloses the use of coded lables containing a plurality of resonators, with each resonator being of a particular resonant frequency, wherein the presence or absence of a resonator having a particular frequency provides one bit of information. In operation, interrogating signals, which cover a spectrum containing the frequencies of the various resonators which comprise the coded label, are directed toward the coded label. The resonators transmit an output signal, when excited by energy of their particular frequency, to a detecting means. It is noted that in Janco, it is necessary that conducting materials be laid on both sides of a dielectric material in the resonator.

U.S. Pat. Nos. 3,247,510, 3,493,955 and 3,500,373 are representative of other systems utilized for identification of articles and for the prevention of theft of articles. U.S. Pat. No. 3,247,510 relates to microwave identification of railroad cars using a change of polarization technique, and U.S. Pat. Nos. 3,493,955 and 3,500,373 relate to article theft detection using electromagnetic radiation.

SUMMARY OF THE INVENTION

The present invention relates to an improved merchandise mark sensing and memory interrogation system utilizing polarization alteration techniques for the interrogation of information encoded labels which comprise a plurality of L-C circuits having particular resonating frequencies. The system is characterized by the use of microwaves to remotely access digital information attached to merchandise, and by achieving this result in a serial access frequency domain mode.

The system comprises four fundamental units, a read-only memory array, comprising a plurality of resonators, which are fastened to every article, e.g., a piece of merchandise; a write unit (transceiver) which encodes the read-only memory array with specific information including a pilferage control bit; a read unit (transceiver) which reads the encoded information and which also destorys the pilferage control bit; and lastly, a pilferage control interrogation unit (transceiver) for determining whether an article has been properly checked out.

In operation, the read-only memory array is encoded with information. This may be accomplished prior to or after fastening the labels on the articles. The labels are read at a check-out counter, which results in the transmission of information to such devices as cash registers, computers, and the like. As the articles are carried out of the place of business, they are interrogated by the pilferage control unit which transmits radio energy of a particular frequency to the encoded label. However, there will be no response from the encoded array because the resonator associated with the pilferage control bit would have been destroyed by the "read unit", i.e., at the check-out counter.

The actual interrogation of a particular article may be accomplished by using a "pulse and listen" principle. The interrogating transceiver provides a fast fall-time pulse of microwave energy at the frequency of the resonator under interrogation and then "listens" for the resonator to "ring", i.e., resonate at the interrogation frequency. It is necessary that the receiver be blanked out during the transmission of the interrogating pulse and listens (turned on) only after the transmitter has been turned off. In this manner, the receiver is able to distinguish the resonating signal from the transmitted interrogating signal.

An improvement found in the instant invention is the utilization of polarized transmitting and receiving antennas for polarizing the microwave energy, thus obviating high frequency switching between the transmitter and the receiver of the interrogating read unit which is necessary when the pulse and listen principle is employed.

BRIEF DESCRIPTION OF THE DRAWINGS

FIG. 6 is a block diagram of the write unit.

FIG. 7 is a timing diagram for the write unit.

FIG. 8 is a block diagram of the read unit.

DESCRIPTION OF THE PREFERRED EMBODIMENT

Figure 1:
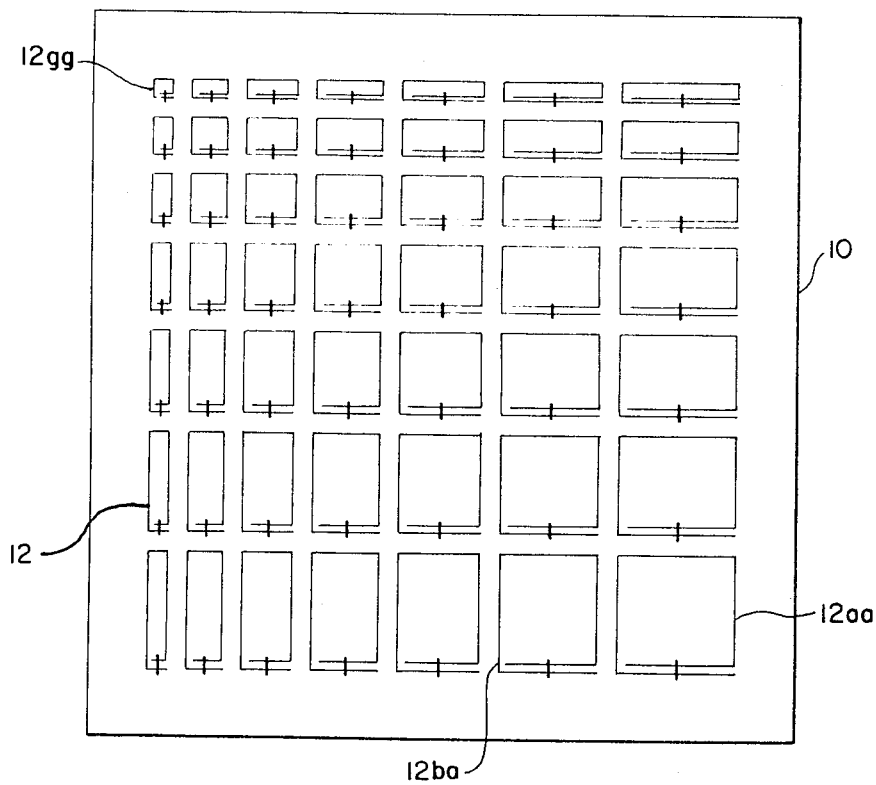
FIG. 1 is a diagrammatic view of a chip containing a plurality of L-C circuits.

Referring to the drawing, particularly to FIG. 1, there is shown a label 10 having, for purpose of illustration, a cross sectional dimension of fifty mils and comprising a plurality of responders 12 which make up what has been previously referred to as a read-only memory. The label 10, often referred to as a chip, is shown as comprising 49 responders 12, although not limited to this number, and is designed to be applied to articles such as, for example, groceries, clothing, or the like by conventional means such as adhesives. The responders range in resonant frequency from 7.0GHz to 11.9GHz. The 49 responders are separated from each other by a difference of nominally 100MHz in the illustrated embodiment and no two responders have like resonant frequencies. It should be noted that no specific amount of difference is necessary, and that the differences need not be equal, so long as the differences are of predetermined magnitude.

The read-only memory is a standardized array of microminiature resonant devices (such as L-C "tank" circuits, referred to as responders) progressively tuned across a wide frequency spectrum. Throughout this specification, the terms "L-C circuits" and "responders" are used interchangeably. The system may utilize some part of the device (such as the inductor in the L-C circuit) as an antenna. A given device is made to resonate and reradiate energy by remotely exiting it with a pulse of energy at its own natural resonant frequency.

Two of the methods by which devices such as L-C circuits can be "destroyed" are by shorting the capacitor or opening the inductor. The label 10 is remotely encoded with information by overdriving selected responders 12 with an excitation pulse which induces an RF current in a selected resonating device larger than that which the device can carry, thereby "destroying" it such that it will respond when interrogated by a signal of its own natural frequency.

Each responder 12 thus represents a bit of information. Those circuits which are complete, i.e., not destroyed, and which resonate within their operating frequency range, may be assigned the value of logical "ones" and those circuits which are not complete and which resonate outside of the operating frequency range may be assigned the value of logical "zeros".

One of the responders 12 is allotted for pilferage control and will be "destroyed" by overexcitation during the normal process of merchandise check-out. All merchandise is interrogated at a pilferage control frequency by a transceiver at each exit. If any piece of merchandise is not checked out properly, the device will remain active and will resonate when interrogated by a signal having a frequency identical to the natural resonant frequency of the pilferage control responder. The response sensed by the receiver drives an alarm or other signaling device to indicate pilferage.

Because of the nature of the processes used to fabricate an aray of such devices, it is generally easier to control the separation of the resonant frequencies than it is to control each precise resonant frequency. More specifically, due to the batch nature of processing, i.e., manufacturing, L-C circuits, the dielectric thickness, dielectric constant, capacitance and inductance cross-section may vary from batch to batch, but not significantly across a 50 mil chip. Therefore, because of this processing phenomenon, each responder 12 will not necessarily be of the specified design resonant frequency. For example, the design frequencies of responder 12aa, 12ba and 12gg might be designed to b 7.0GHz, 7.1GHz and 11.9GHz respectively. However, in actuality, the natural frequency of responder 12aa might be 7.0GHz ± .001GHz. Similarly responder 12ba might be 7.1GHz ± .001GHz. Therefore, it can be seen that if the frequency were critical, many of the batch processed L-C circuits would, of necessity, be discarded. However, it has been discovered that although there might be a variance in the natural resonant frequency of each responder, the variance in each L-C circuit will be approximately the same and in the same direction, i.e., the frequency differences between L-C circuits will be nearly equal. To be specific, if the actual frequency of responder 12aa were 7.001GHz, which is 0.001GHz greater than the design frequency of 7.000GHz, the probability is very great that the natural frequency of responder 12ba is 7.101GHz, also 0.001 greater than the design frequency of 7.100GHz. It can thus be seen that while the actual natural resonant frequency might vary from the designed frequency, that the frequency differences between responders will be approximately the same. It would be prohibitive in cost to attempt to control the processed resonant frequency of the L-C circuits within ± 10MHz. Since the difference in frequencies between the responders is approximately the same, a sliding frequency scale for encoding and interrogating is used because the absolute magnitude of the resonant frequency is not the important parameter, but what is critical is that each resonant frequency of the L-C circuits on the chip be 100MHz apart.

Figure 2:
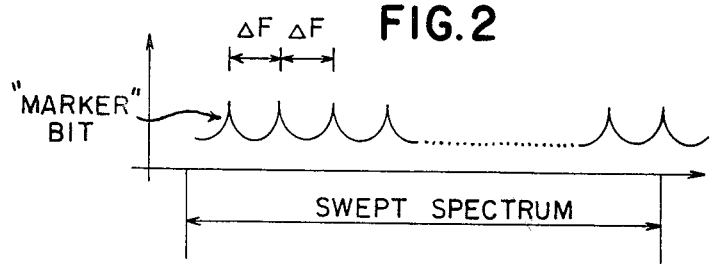
FIG. 2 illustrates the sweep scale utilized in the instant invention.

Each memory array contains a greater number of devices than are required to hold the required data — i.e., the resonant frequencies are designed to extend beyond both limits of the operating frequency range. To locate the first bit within the operating frequency, the transceiver begins sweeping up from the beginning of the range until it detects the first device whose resonant frequency lies within this range. This first device is called the "marker bit" (FIG. 2) and its corresponding frequency is the marker frequency. If the resonant frequencies of the array are separated by an interval $\Delta f$, 100MHz in this instance, then this marker frequency must lie within $\Delta f$ Hertz of the beginning of the frequency range. The transceiver subsequently interrogates in steps of $\Delta f$, beginning with the marker frequency. The sliding frequency scale is used in the writing process in a similar way.

Figure 3:
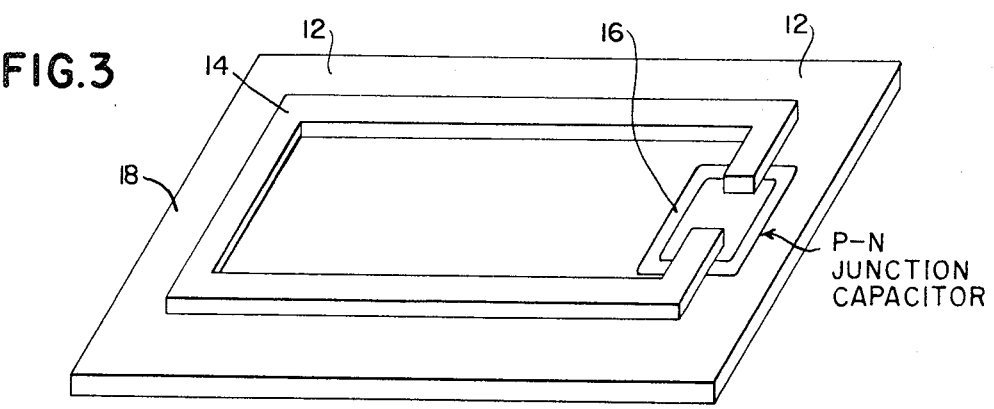
FIG. 3 is an enlarged plan view of an L-C circuit as used in this invention.

FIG. 3 illustrates, in greater detail, a responder 12 such as shown in FIG. 1. The responder 12 comprises a microstrip of a metallized inductor 14, having a rectangular configuration, the length of which may, in a typical embodiment, range from 3 to 10 mils. The open ends thereof are connected to a p-n junction capacitor 16, thus forming what is often referred to as an L-C tank circuit. The responder 12 is formed on a substrate 18 such as a passivated silicon substrate, by conventional metal deposition or etching techniques. The thickness of this substrate, in a typical embodiment, may be 2 to 4 mils. This type of resonator will have a Q of 1–10 at X-band frequencies.

Figure 4:
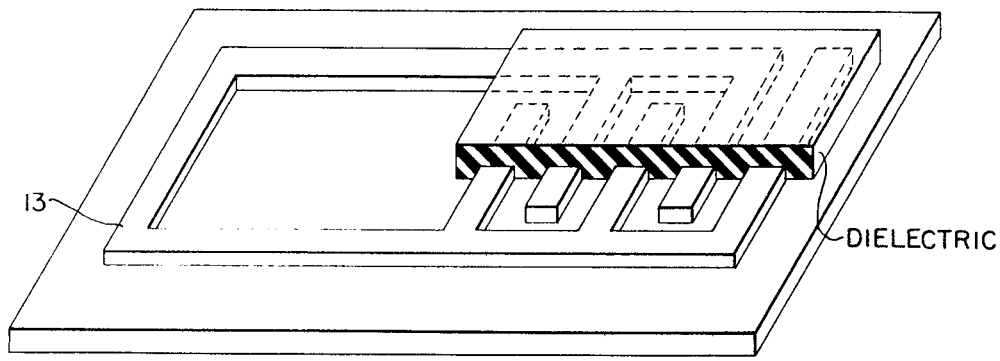
FIG. 4 illustrates an alternate L-C structure, partially in section.

FIG. 4 illustrates an alternate from of a responding circuit comprising an inductor 13 having a rectangular configuration and terminated in a series of interdigitated fingers. This type of responder may be fabricated by etching copper clad Mylar. The terminated interdigitated fingers are shown coated with a dielectric to increase the capacitance.

Figure 5:
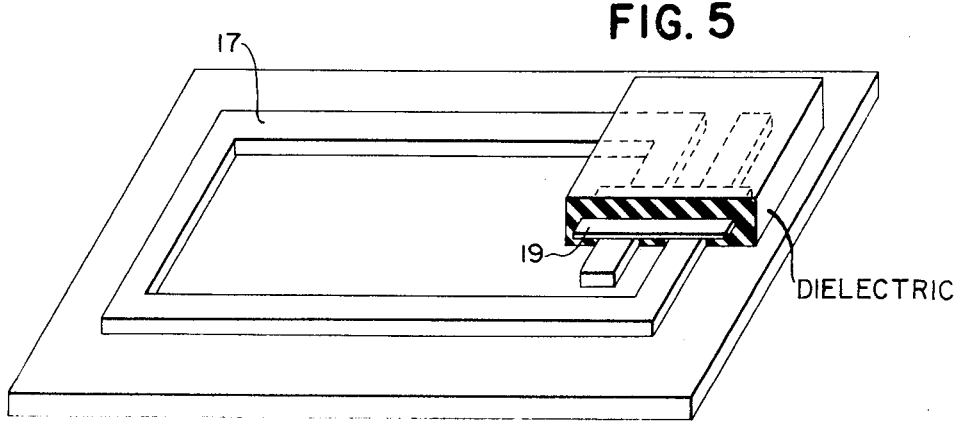
FIG. 5 illustrates a second alternate L-C structure, partially in section.

FIG. 5 illustrates yet another form of a responding circuit comprising a thin film inductor 17 having a rectangular configuration. The capacitor can be fabricated by growing an oxide such as cupric or chromic over the inductor 17, then adding a conductor 19.

FIGS. 6 and 7 illustrate a functional block diagram of the "write" unit and the associated timing diagram respectively. A conventional manual keyboard 20 is connected to a conventional buffer memory 22 which may be of the solid state type. The buffer memory 22 receives an input from a clock 24 and has an output connected to a blanking circuit 26, which has an output connected to a sweep generator 28, which in turn is connected to outputs from the clock 24 and a sweep controller 30. The sweep generator 28 provides an output to a variable controlled oscillator (VCO) 32 which in turn is connected to a power amplifier 33. A transmitting antenna 34 is coupled to the power amplifier 33. A receiving antenna 36 is coupled to a receiver 38, the output of which is connected to the sweep controller 30. The sweep controller has two outputs, one of which is connected to the clock 24 and the other to the sweep generator 28.

During the writing operation, i.e., the encoding of the label 10, the manual keyboard 20 is used to input the desired information into the buffer memory 22 in the form of bits having assigned values of logical 1 or 0. To begin the actual writing, the controller 30 sweeps the VCO 32 across the operating frequency spectrum with an attenuated output in order to prevent damage to the responders 12. The sweep continues in small finite steps until the receiver 38 detects the "marker" frequency bit (waveform A of FIG. 7). The marker frequency is transmitted by the first L-C circuit which responds to the swept transmitted signal. At the time of reception, the clock 24 is actuated (waveform B of FIG. 7), which results in serially shifting out of the buffer memory 22 (waveform C of FIG. 7) any information which is to be written into the label 10. The clock 24 also pulses the sweep generator 28 which directs the VCO 32 to transmit amplified microwave energy (waveform E of FIG. 7) towards the label 10 at a magnitude sufficient to destroy an L-C circuit, if required in accordance with the information stored in the buffer memory 22. For example, let it be assumed that the first bit in the buffer memory 22 is a zero (waveform C of FIG. 7). The VCO power voltage (waveform D of FIG. 7) for this period of time is at a magnitude greater than that required for reading. Therefore, an L-C circuit responding to the particular frequency transmitted at this point in time will be destroyed. Thus when sensed at some later time, this destroyed L-C circuit will not respond, which in this system designates a zero.

The frequencies transmitted are adjusted to align with those of the resonators by properly choosing the values of the clock and sweep rates. The information stored in the buffer memory 22 determines the operation of the blanking circuit 26, i.e., 1 bits energize the blanking circuit 26 which prevents the pulsing of the VCO 32, so that the L-C circuit associated with the frequency which was to have been transmitted at that point is not destroyed, while 0 bits have no effect on the blanking circuit. Thus, if a particular bit frequency represents a 1, its corresponding resonator in the read-only memory array is unaffected by the "write" unit and will therefore respond when interrogated by the "read" unit, as will subsequently be explained.

Figure 9:
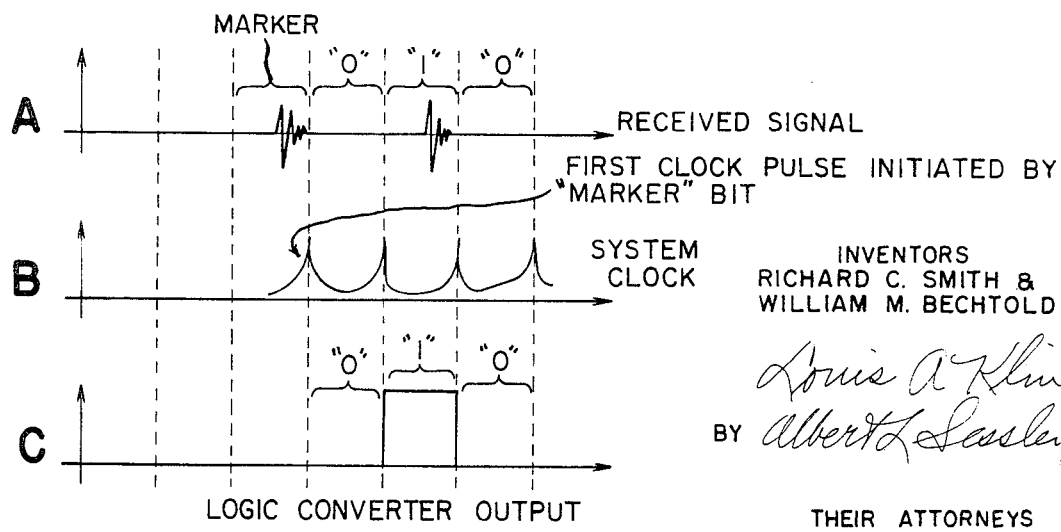
FIG. 9 is a timing diagram associated with the read unit.

FIGS. 8 and 9 illustrate the interrogating unit, i.e., the read unit and the associated timing diagram respectively. A clock 60 is connected to a sweep generator 62 which receives a signal input from a sweep controller 66. The sweep generator 62 output is connected to a variable controlled oscillator (VCO) 64 which in turn is connected to a power amplifier 40, and the output of the power amplifier 40 is coupled to a polarizing transmitting antenna 42 which may be a conventional slot antenna. A receiving antenna 52 which is polarized in a different orientation than the transmitting antenna is coupled to a receiver 50 having two outputs respectively connected to the sweep controller 66 and a logic buffer 46. The logic buffer 46 is connected to a utilization device 44 such as, for example, a cash register. The logic buffer may comprise a conventional diode tree and a storage register.

In operation, the interrogation unit is positioned at some check point through which the articles must pass. The VCO 64 is controlled by the sweep generator 62 and the clock 60 in the transmission of microwave energy across a frequency scale at intervals of $\Delta f$. The microwave energy is polarized by the antenna 42 which may be a slotted antenna polarized, for example, in a vertical direction. Any L-C responder 12 which receives microwave signals at its natural resonating frequency, whether or not that signal is polarized, will in turn reradiate energy. This reradiated energy will not have any particular polarization but will contain energy of all possible polarizations. The receiving antenna which may be a slotted antenna and polarized, for example, in a horizontal plane, will receive only signals having a horizontal plane of polarization. Therefore it can be seen that there can be no interference between those signals transmitted from the antenna 42 and those received by the antenna 52. Referring to waveform A of FIG. 9 it can be more easily seen that upon the reception of the marker pulse, the clock 60 is set in operation resulting in the transmission of energy in 100MHz steps (waveform B of FIG. 9). It can be seen (waveform A of FIG. 7) that the absence of energy indicates a 0 bit of information and the presence of received energy indicates a 1 bit. The received signals are coupled to the conventional logic buffer 46 where they are temporarily stored and converted into signals capable of being utilized by the utilization device 44 (waveform C of FIG. 9).

As was mentioned earlier, one responder 12 on the label 10 is reserved for the purpose of pilferage control, which responder is destroyed at the interrogating station by a transmitter which overdrives it. This may be done under manual control or it may be programmed. In order to best utilize the present invention, it is necessary to establish pilferage control interrogators at each point of egress from the establishment. The pilferage control interrogator is not shown since it would be similar to the interrogator unit of FIG. 8 with the exception that a signal having only one frequency need be transmitted, namely the natural frequency of the L-C responder 12 which is chosen as the pilferage control bit. The receiver of this unit would receive no signals if the pilferage control bit were destroyed by the interrogating station at the check-out point. However, if this were not the case, the receiver would generate a signal which could be used to sound an alarm or other indicating device.

The invention described here illustrates a system in which a microminiature device may be remotely read, independent of orientation, and with wide tolerance with respect to depth of field and skew. The transmitter in the illustrated embodiment would require an operating spectrum of 7.0 to 12.1 GHz with a frequency separation of 100MHz and a maximum power level of 100mw. The pulse width could be from 5 to 10 microseconds. The receiver would require an operating spectrum of 7.0 to 12.0GHz.

What is claimed is:

1. A sensing system comprising: a transistor for generating output microwave interrogation signals in predetermined increments over a predetermined frequency range and at a predetermined magnitude;
   a first antenna polarized in a first direction and coupled to said transmitter such that all transmitted microwave signals have one initial plane of polarization;
   a plurality of responder circuits, each responsive to certain of said transmitted microwave signals, and each having a particular natural resonating frequency and separated by a predetermined difference from any other resonating frequency, each responder circuit being capable of reradiating microwave energy containing substantially all possible planes of polarization at its natural resonating frequency;
   a second antenna polarized in a second direction capable of intercepting and detecting that portion of reradiated energy having a plane of polarization in said second direction;
   means coupled to said second antenna for developing electrical signals in conformance with those intercepted by said second antenna; and
   memory means for storing said developed electrical signals.

2. A system according to claim 1, and also including a utilization device responsive to said electrical signals stored in said memory means.

3. A system according to claim 1 wherein each responder circuit comprises a single turn inductor terminated in a p-n junction capacitor.

4. A system according to claim 1 wherein each responder circuit comprises a rectangular single turn inductor with side dimensions ranging from 3 to 10 mils.

5. A system according to claim 1 wherein each responder circuit comprises a single loop inductor terminated in a series of interdigitated fingers coated with a dielectric.

6. A sensing system comprising:
   a transmitting device for transmitting microwave signals in steps differing by predetermined frequency increments over a predetermined frequency range and predetermined magnitude;
   a first polarized antenna coupled to said transmitting device such that all transmitted microwave signals are polarized in a first direction;
   an encoded read-only memory, responsive to said transmitted microwave signals, and formed by a plurality of L-C circuits, each L-C circuit having its own particular natural resonating frequency and each resonating frequency being separated from at least one other resonating frequency by a frequency difference of said predetermined frequency increment, said resonating circuits being capable of reradiating signals containing substantially all possible planes of polarization;
   a second polarized antenna capable of receiving only that portion of reradiated energy polarized in a second direction;
   receiving means coupled to said second antenna for receiving energy detected by said second polarized antenna;
   means for converting energy received by said receiving means into logic signals; and
   a utilization device for said logic signals.

7. A system according to claim 6 in which said predetermined frequency increment is approximately 100MHz.

* * * * *

UNITED STATES PATENT OFFICE
CERTIFICATE OF CORRECTION

Patent No. 3,774,205  Dated November 20, 1973

Inventor(s) Richard C. Smith & William M. Bechtold

It is certified that error appears in the above-identified patent and that said Letters Patent are hereby corrected as shown below:

Column 7, line 1, delete "transistor" and substitute

--transmitter--.

Signed and sealed this 14th day of May 1974.

(SEAL)
Attest:

EDWARD M. FLETCHER, JR.  C. MARSHALL DANN
Attesting Officer  Commissioner of Patents